US012579916B2

(12) United States Patent
Neiman et al.

(10) Patent No.: US 12,579,916 B2
(45) Date of Patent: Mar. 17, 2026

(54) POPUP VIDEO DISPLAY SYSTEM

(71) Applicant: BIG Digital Corp., North York (CA)

(72) Inventors: Yakov Neiman, North York (CA); Michael Girgis, North York (CA); Dmitri Melamed, North York (CA); Jeff Wismer, North York (CA); Diego Grimaldi, North York (CA); Mazen Salloum, Toronto (CA); Emmett Martin, North York (CA); Adam Smith, North York (CA)

(73) Assignee: BIG Digital Corp., North York (CA)

( * ) Notice: Subject to any disclaimer, the term of this patent is extended or adjusted under 35 U.S.C. 154(b) by 0 days.

(21) Appl. No.: 17/786,443

(22) PCT Filed: Dec. 16, 2020

(86) PCT No.: PCT/CA2020/000140
§ 371 (c)(1),
(2) Date: Jun. 16, 2022

(87) PCT Pub. No.: WO2021/119797
PCT Pub. Date: Jun. 24, 2021

(65) Prior Publication Data
US 2024/0029593 A1 Jan. 25, 2024

(30) Foreign Application Priority Data
Dec. 16, 2019 (CA) ................................ CA 3065203

(51) Int. Cl.
*G09F 13/22* (2006.01)
*G09F 9/302* (2006.01)
*H04N 21/414* (2011.01)

(52) U.S. Cl.
CPC ..... *G09F 9/3023* (2013.01); *H04N 21/41415* (2013.01)

(58) Field of Classification Search
CPC ........ G09F 9/3026; G09F 9/33; G09F 13/005; G09F 15/0056; G09F 13/04; G09F 13/02
See application file for complete search history.

(56) References Cited

U.S. PATENT DOCUMENTS

| | | | | |
|---|---|---|---|---|
| 6,677,918 | B2 * | 1/2004 | Yuhara | G09F 9/33 |
| | | | | 345/82 |
| 6,741,222 | B1 * | 5/2004 | Tucker | G09F 9/33 |
| | | | | 345/1.1 |

(Continued)

FOREIGN PATENT DOCUMENTS

| | | |
|---|---|---|
| AU | 2018100568 A4 | 5/2018 |
| EP | 1193670 A1 | 4/2002 |

(Continued)

OTHER PUBLICATIONS

International Search Report of PCT/CA2020/000140 dated Mar. 2, 2021.

(Continued)

*Primary Examiner* — Shin H Kim
(74) *Attorney, Agent, or Firm* — Banner & Witcoff, Ltd.

(57) ABSTRACT

A popup video display system is provided, which includes a digital screen component in communication with a content feeding system for displaying content, and a structural component having a weighted base portion with at least a pair of tube openings spaced to receive prongs of a forklift, and a mounting portion connecting the digital screen to the weighted base. The weighted base provides sufficient ballast and stability that the system can be deployed in a freestanding fashion without physically connecting the base portion to a substrate or ground or floor surface. Methods of deploying a popup video display system by forklift or crane are also provided.

12 Claims, 12 Drawing Sheets

(56) References Cited

U.S. PATENT DOCUMENTS

| | | | | |
|---|---|---|---|---|
| 6,813,853 B1 * | 11/2004 | Tucker | G09F 9/33 | 345/82 |
| 6,926,375 B2 * | 8/2005 | Nagamine | G09F 9/33 | 40/550 |
| 8,220,854 B2 * | 7/2012 | Cohen | G09F 21/04 | 296/168 |
| 8,376,581 B2 * | 2/2013 | Auld | G09F 15/0062 | 345/55 |
| 9,477,438 B1 | 10/2016 | Hochman et al. | | |
| 10,056,016 B2 * | 8/2018 | Truijen | G09F 15/0025 | |
| 11,631,348 B2 * | 4/2023 | Mier-Hicks | G09F 9/3026 | 40/452 |
| 11,657,739 B2 * | 5/2023 | Hornsby | G09F 21/04 | 40/592 |
| 11,783,737 B2 * | 10/2023 | Cline | G09F 13/34 | 40/563 |
| 2002/0116717 A1 * | 8/2002 | Eller | G09F 27/00 | 725/147 |
| 2003/0086761 A1 * | 5/2003 | Anderson | E01F 13/022 | 404/6 |
| 2003/0217495 A1 * | 11/2003 | Nagamine | H05K 5/30 | 40/605 |
| 2004/0049960 A1 * | 3/2004 | Percy | G09F 27/00 | 40/590 |
| 2005/0278998 A1 * | 12/2005 | Sawhney | G09F 13/20 | 40/541 |
| 2006/0048420 A1 * | 3/2006 | Fried | G09F 21/04 | 40/592 |
| 2006/0291241 A1 * | 12/2006 | Wojtowicz | G09F 13/04 | 362/604 |
| 2007/0226762 A1 | 9/2007 | Girgis et al. | | |
| 2008/0078112 A1 * | 4/2008 | Basha | G09F 7/22 | 40/606.15 |
| 2008/0078733 A1 * | 4/2008 | Nearman | G09F 9/3026 | 211/189 |
| 2009/0183405 A1 * | 7/2009 | Wilkes | G09F 27/007 | 40/543 |
| 2011/0012751 A1 * | 1/2011 | Jones | H04L 67/125 | 439/502 |
| 2011/0057215 A1 * | 3/2011 | Chen | G09F 7/002 | 257/E33.056 |
| 2012/0139888 A1 * | 6/2012 | Fujimori | G09F 27/007 | 345/211 |
| 2013/0170193 A1 * | 7/2013 | Shigeta | H02S 20/10 | 362/183 |
| 2014/0267896 A1 * | 9/2014 | Cox | H04N 5/63 | 348/383 |
| 2014/0290104 A1 * | 10/2014 | Lindblom | G09F 15/00 | 40/610 |
| 2016/0078790 A1 * | 3/2016 | Truijen | G09F 15/0012 | 40/607.1 |
| 2016/0125772 A1 * | 5/2016 | Li | G09F 13/18 | 40/544 |
| 2016/0133203 A1 * | 5/2016 | Jurewicz | G06T 3/18 | 345/1.3 |
| 2016/0161047 A1 | 6/2016 | Kaytes | | |
| 2017/0116893 A1 | 4/2017 | Valentine | | |
| 2020/0160378 A1 * | 5/2020 | Komori | G06V 40/10 | |
| 2021/0054982 A1 * | 2/2021 | Moran | F21V 23/0464 | |
| 2021/0173604 A1 * | 6/2021 | Park | G09F 27/00 | |
| 2022/0267131 A1 * | 8/2022 | Magzimof | B66F 9/07581 | |

FOREIGN PATENT DOCUMENTS

| | | |
|---|---|---|
| IT | 201800005130 A1 | 11/2019 |
| WO | 2006/081604 A1 | 8/2006 |

OTHER PUBLICATIONS

Feb. 9, 2023—(CA) Office Action of CA 3,065,203.
Feb. 29, 2023—(CA) Office Action of CA 3,065,203.
Jan. 3, 2024—(GB) Examination Report of GB2210417.8.
Dec. 8, 2023 (EP)—European Search Report of EP20 90 2063 completed Nov. 29, 2023.
Nov. 21, 2024—(GB) Examination Report of GB2210417.8 (pp. 1-4).
Sep. 4, 2024—(GB) Examination Report of GB2210417.8 (pp. 1-2).
Jan. 3, 2025—(GB) Intention to Grant of GB2210417.8 (pp. 1-2).

* cited by examiner

| | | |
|---|---|---|
| LED MODULE 130 | LED MODULE 130 | LED MODULE |
| LED MODULE | LED MODULE | LED MODULE |
| LED MODULE | LED MODULE | LED MODULE |
| LED MODULE | LED MODULE | LED MODULE |

POPUP VIDEO DISPLAY SYSTEM

The present application is a U.S. National Phase Application under 35 U.S.C. § 371 and applicant herewith claims the benefit of priority of PCT/CA2020/000140 filed Dec. 16, 2020, which claims priority to Canadian Application No. 3065203, filed Dec. 16, 2019, which is incorporated by reference herein in its entirety.

FIELD OF THE INVENTION

The invention relates to video display systems, and more particularly relates to popup freestanding video display systems.

BACKGROUND

Small-scale video display systems have become ubiquitous as they replace enclosed maps and posters in advertising, wayfinding, and information signage contexts. For example, LED screens and arrays of LED tiles are known. Such digital display systems are used, for example, in indoor contexts such as malls and theatres, and in outdoor contexts such as bus enclosures and roadside billboards.

Transporting and installing such display systems has been problematic. The systems themselves can be heavy, bulky and expensive, and they are awkward to deploy. Transportation typically involves large trucks, and specialized and expensive lifting equipment (e.g. involving suction devices). At site, such displays are typically transported to their installation spot in pieces requiring site assembly, and the largest of these components (typically the display screens) may be transported with specialized transportation jigs, ramps, or bogies.

In indoor contexts, there are transportation obstacles such as kerbs, pavements, retail canopies, bollards to be navigated or avoided. In outdoor contexts, in addition to man-made and natural obstacles, there are the rigours of climate and weather to contend with—variable temperature, precipitation, and particularly wind. In indoor and outdoor contexts, vandalism, theft and tampering are also concerns.

Accordingly, for all of these reasons, prior art developers have taken great care to make such systems heavily armoured and ground-anchored. Digital billboards, in particular, have huge plinths that provide a ground-anchored foundation. Other digital display systems may simply be bolted into a floor, pavement block, or other substrate. Even systems described as "freestanding" are typically anchored into the ground one way or another (i.e. they may be freestanding only in the sense that they do not require the support of another upright component or the need to be "built into" permanent structures).

As the installation and deployment of such systems is complex and costly, such systems have not been thought to be suitable for short-term uses—concerts, festivals, fairs, trade shows, temporary exhibits and promotions, and temporary signage for limited time events or conditions, indoor or outdoor, which of necessity need rapid-deployment and ease of takedown/removal. Users at such places and events would benefit from such digital displays to enjoy useful and engaging content. Promoters and sponsors of such events would benefit from providing such content in a high-traffic environment. Landlords and property managers can also benefit from providing impactful digital messaging for special events, sales or promotions using a temporary (or semi-permanent) billboard structure.

SUMMARY OF THE INVENTION

According to a first aspect of the invention, a popup video display system is provided. The system includes a digital screen component in communication with a content feeding system for displaying content. A structural component includes a weighted base portion with at least a pair of tube openings spaced to receive prongs of a forklift; and a mounting portion for connecting the digital screen component to the weighted base portion. The weighted base portion provides sufficient ballast and stability that the system can be deployed in a freestanding fashion without physically connecting the base portion to a substrate or ground or floor surface. The base and mounting portion of the structural component may be part of a single unit or may be physically separate components.

Preferably, the digital screen is made up of tiles, and the tiles combine to display the content.

Various embodiments of a weighted base portion are contemplated. These include various solid heavy materials (molded, cast or constructed), either of one piece (integral) with the rest of the structural component or in separate connected pieces. Some non-limiting examples of materials include concrete and steel.

The mounting portion may include a frame, integral with or connected to the weighted base portion, wherein the digital screen is connected onto the frame.

Some embodiments of the system further comprise a camera or sensor, in communication with the content feeding system. Data from the camera or sensor (e.g. by interacting with the camera or sensor) can be used to affect the content displayed on the digital screen.

In some embodiments, a ruggedized cladding structure is provided that cloaks in part the digital screen. At least a part of the content feeding system may be mounted on or contained in the cladding structure.

According to a second aspect of the invention, a method is provided for deploying a popup video display system. A forklift is used to engage and lift a preassembled video display system (by engaging the prongs of the forklift with tubes in the base of the system). The system includes:

a digital screen component having a plug-and-play connector for connecting to a content feeding system;

a structural component having:

a mounting portion that connects to the digital screen; and a weighted base portion to which the mounting portion is connected, the weighted base portion having a pair of forklift tubes spaced to receive the prongs.

After the forklift deposits the preassembled video display system on a ground or floor surface of a site, the connector is connected to the content feeding system using a wired or wireless connection. The system stands in a freestanding fashion without the need to connect the base portion to a substrate or to the ground or floor surface.

The video display system may further comprise a cladding structure cloaking in part the digital screen. In some embodiments, the cladding is added on site.

According to a third aspect of the invention, a method is provided for deploying a popup video display system. A preassembled video display system is provided on a site. The system includes:

a digital screen component having a plug-and-play connector for connecting to a content feeding system;

a structural component having:

a mounting portion that connects to the digital screen, the mounting portion including a pair of hooks or ears engageable by a crane; and a weighted base portion to which the mounting portion is connected.

A crane is used to lift the preassembled video display system by its hooks or ears and deposit it on a ground or floor surface of a site. The connector is connected to the content feeding system using a wired or wireless connection. The system stands in a freestanding fashion without the need to connect the base portion to a substrate or to the ground or floor surface.

BRIEF DESCRIPTION OF THE FIGURES

FIGS. 2A and 2B are detailed front and back views of the screen portion of the system.

DETAILED DESCRIPTION

Figure 1A:
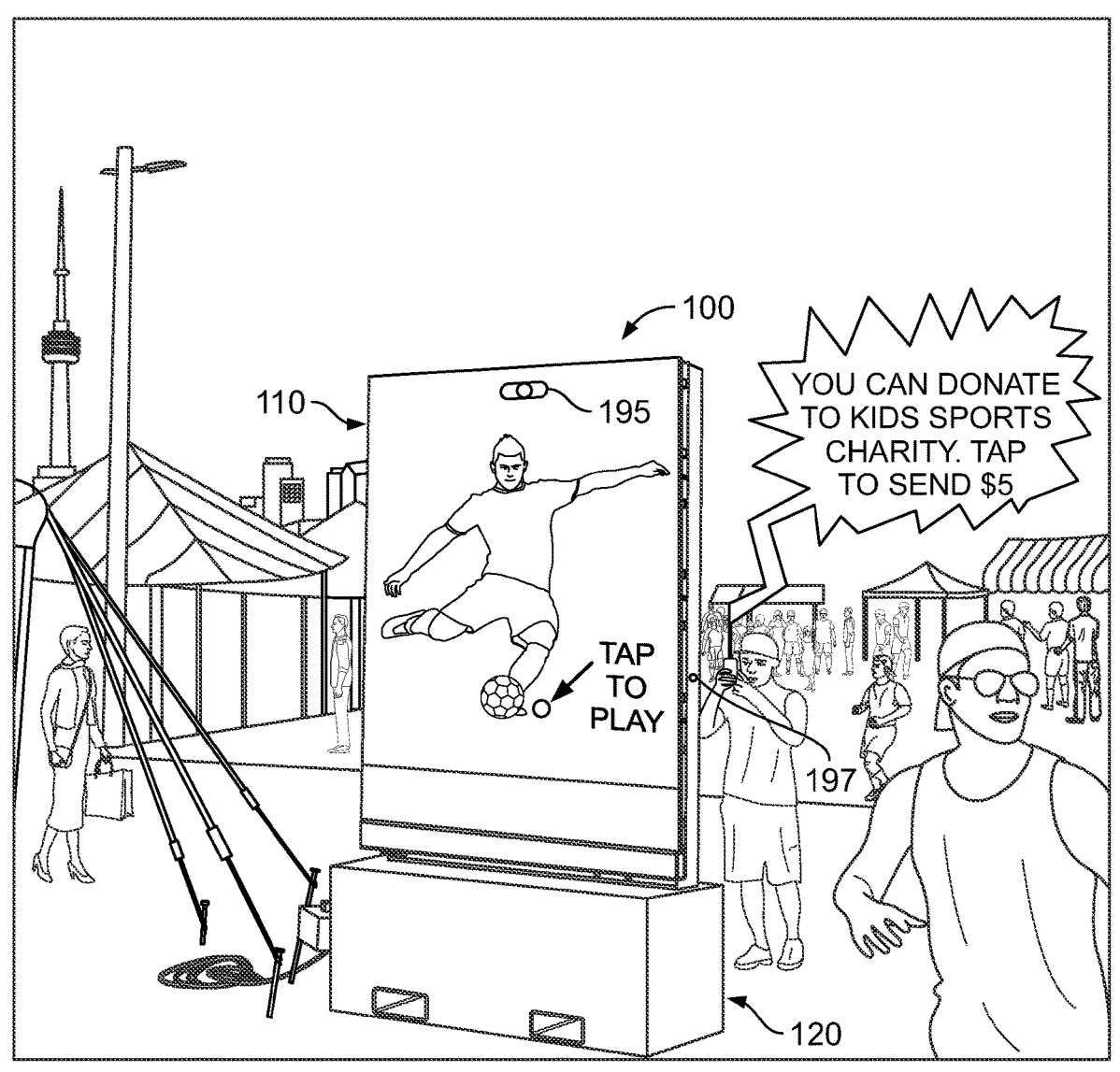
FIGS. 1A and 1B are perspective views of single and double wide popup video display systems.
Figure 1B:
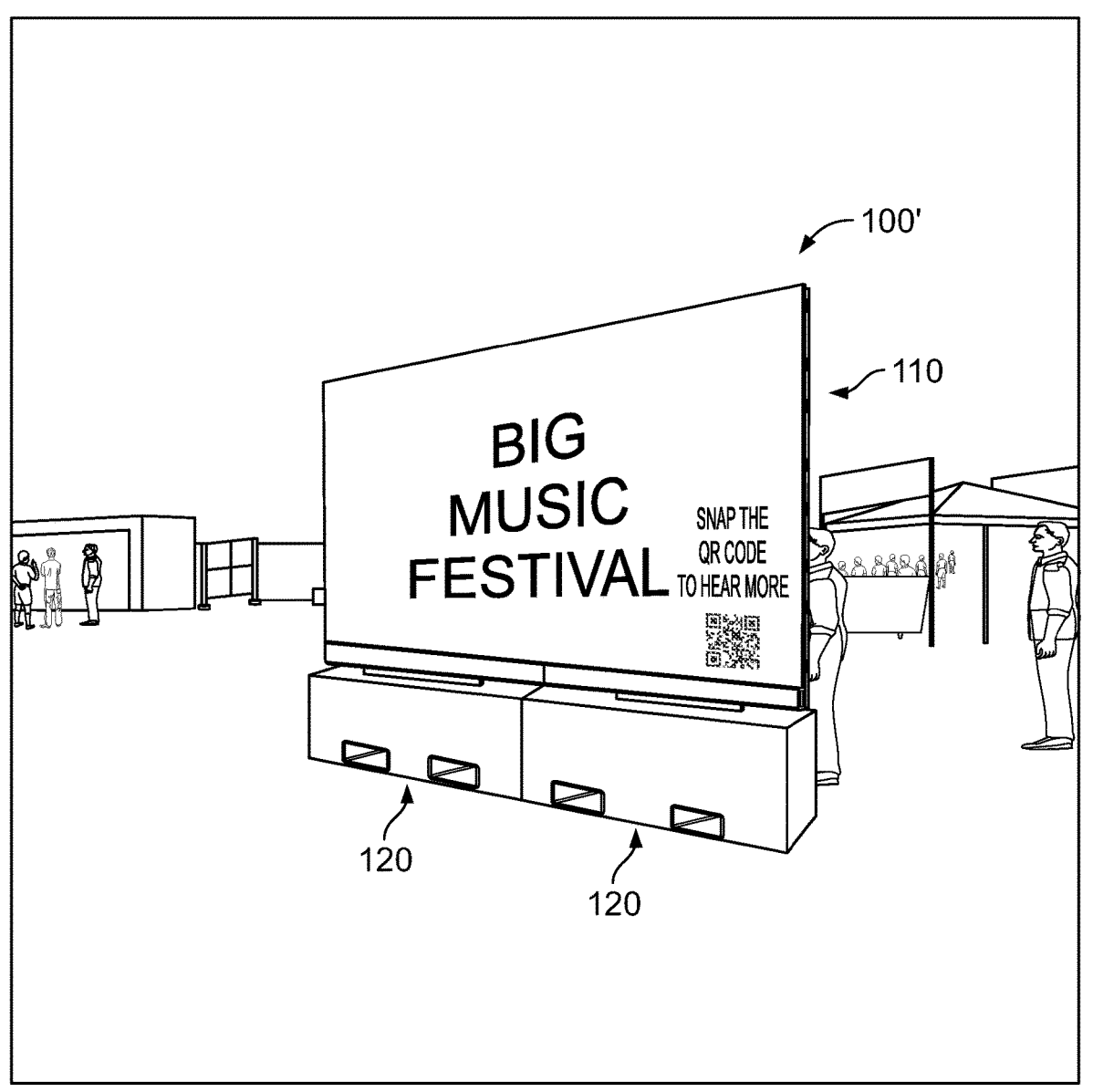

As shown in FIGS. 1A and 1B, the invention provides a popup video display system 100 for short-term uses—concerts, festivals, fairs, trade shows, temporary exhibits and promotions, and temporary signage for limited time events or conditions. Briefly, the system includes two main components: a screen component 110 and a structural component 120. These may be notional components of a single physical structure (i.e. one popup system that is simply deployable as a unit), or they may be physically separate components (preferably preassembled, or in some cases, with minimal assembly on site).

FIG. 1A shows a single-wide popup video display system 100, while FIG. 2A shows a double-wide popup video display system 110'. Other configurations, relative widths and heights are also contemplated following the same principles. These are just provided by way of simple illustration.

The screen component 110 preferably uses multiple monitors or small displays (typically with narrow bezels) in a tiled array to form one larger screen. These modules are typically clipped together to form one large screen, so that the overall visual impression is of a contiguous display. Some typical display technologies include LCD panels, Direct View LED arrays, blended projection screens, Laser Phosphor Displays, and rear projection cubes. Outdoor grade LED tiles 130 are an exemplary implementation, as shown in FIGS. 2A and 2B.

Figure 2B:
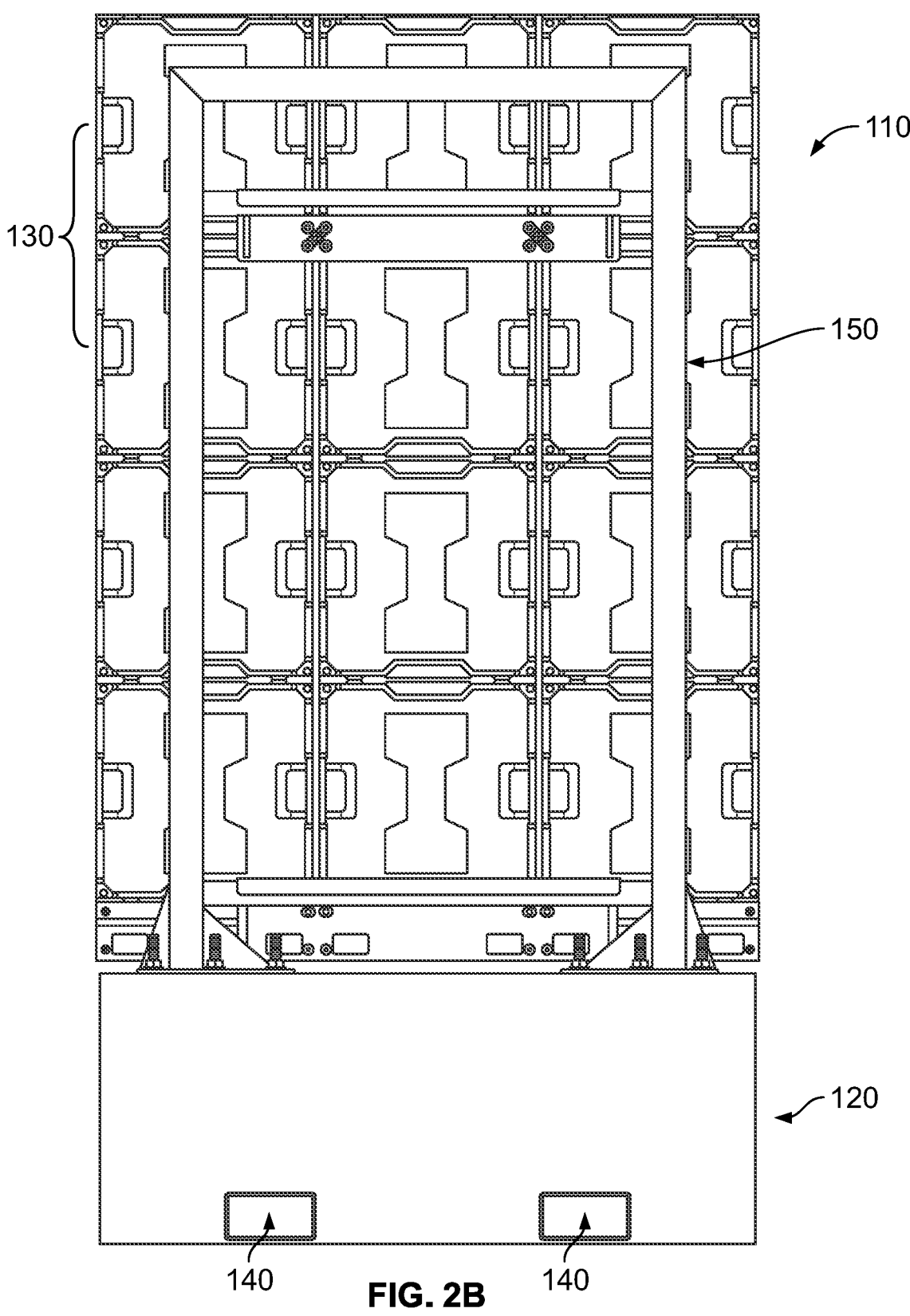

Such screens 130 may contain the hardware necessary to stack similar screens together, along with connections to daisy chain power, video, and command signals between screens (see FIG. 2B). Command signals may, for example, power all screens in the array on or off, or calibrate the brightness of a single screen after bulb replacement.

One possible arrangement of individual screen tiles (LED modules) 130 is shown in FIGS. 2A (front) and 2B (rear). A 3×4 array is shown in these Figures. Embodiments with a 3×5 array or other configuration are also possible (along with many other relative sizes and dimensions). In its overall configuration, the screen (relative to the base) may be of a portrait, landscape, vertical or horizontal aspect or orientation, it may be multi-sided, wrapped, radiused, boxed, rounded, among other variations. Further, the dimensions of the screen and base may be similar to or different from each other, as logistical or artistic preferences dictate.

The structural component 120 may include a custom (e.g. solid) steel base or another base unit (e.g. concrete block) with, preferably, at least a pair of tubes 140 spaced and sized for receiving prongs of a forklift. In a double-wide deployment, as shown in FIG. 1B, the system may be made up of two single-wide units (each with a base and screen), which are aligned side-by-side and the screen components ganged together to form a continuous double- (or triple-, etc.) wide array (or one large unit may have multiple openings for receiving forklift prongs).

Figure 4:
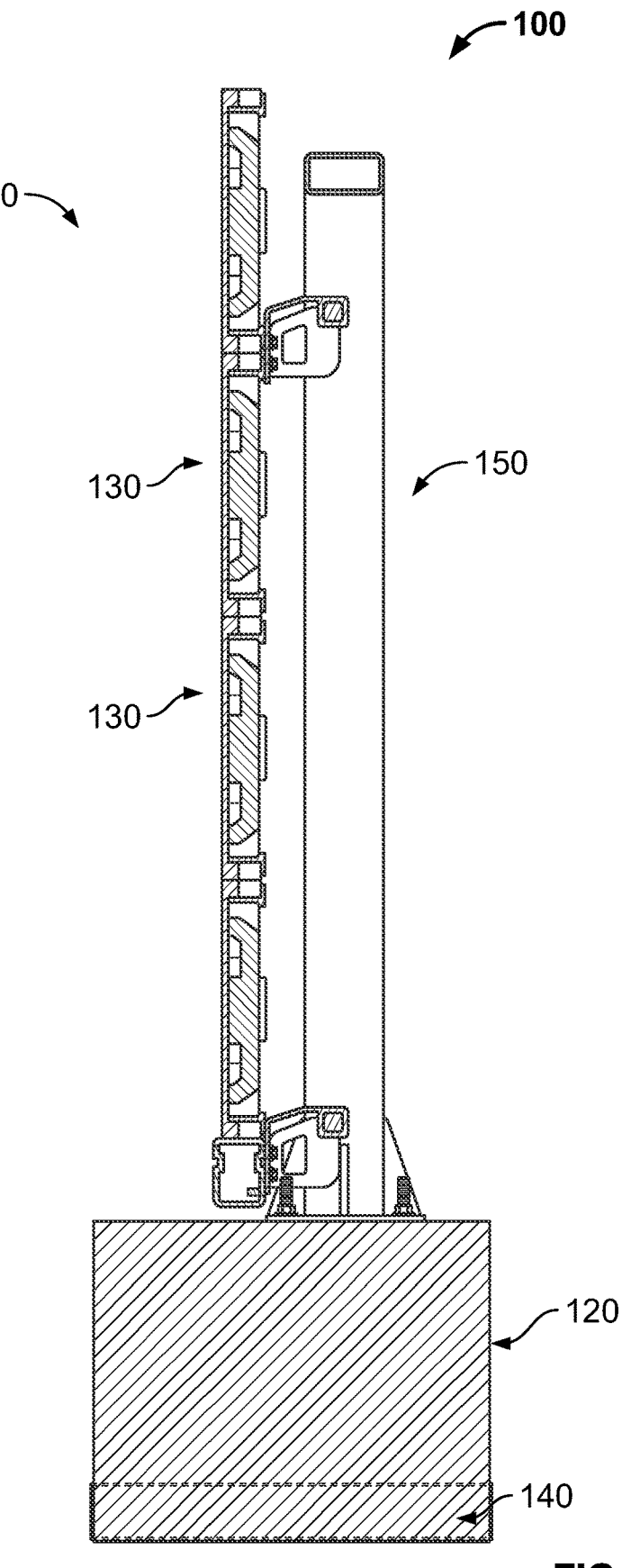
FIG. 4 is a cross-sectional view through line 4-4 of FIG. 3.
Figure 5A:
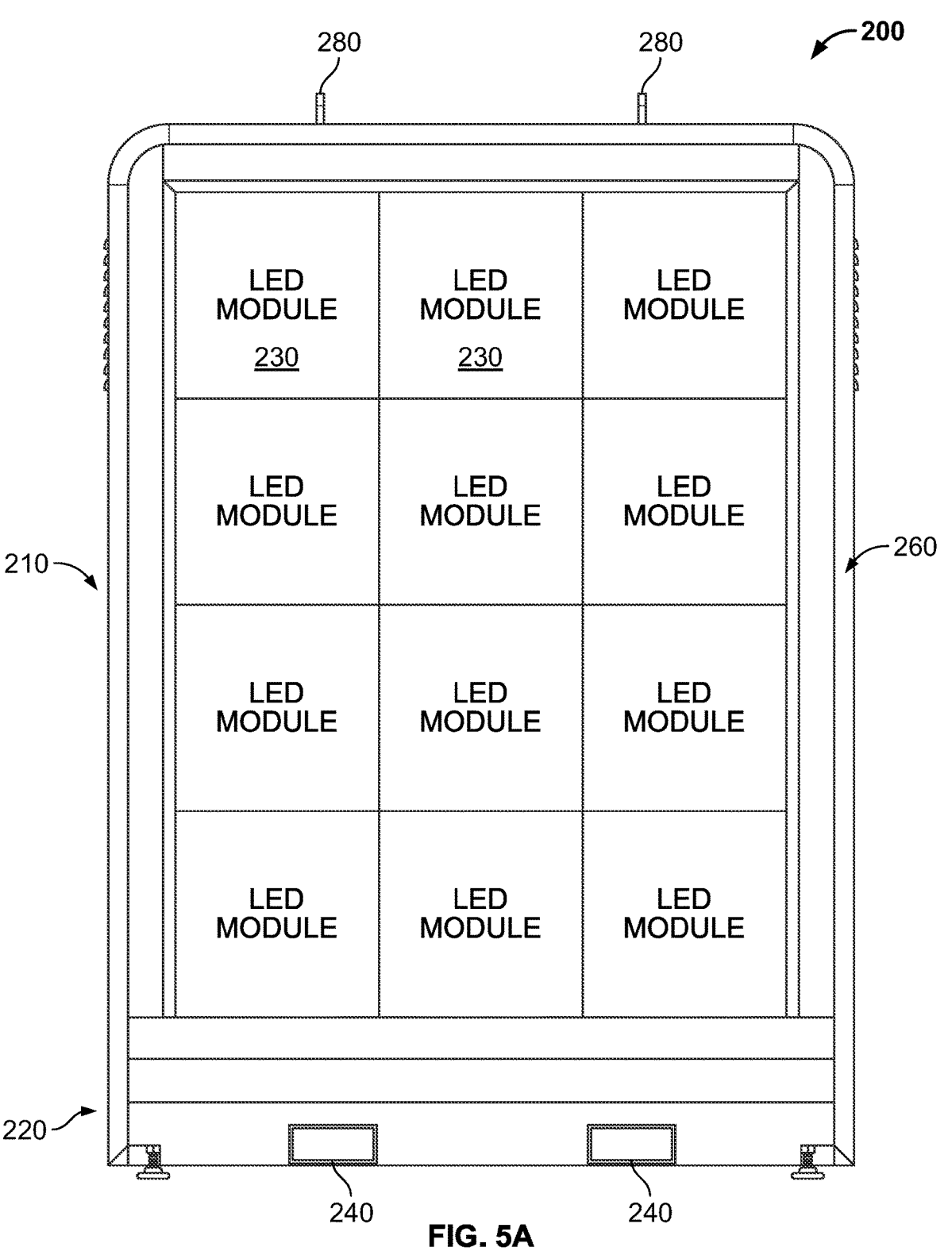
FIGS. 5A and 5B are detailed front and back views of a cladded system with an alternative base portion.
Figure 5B:
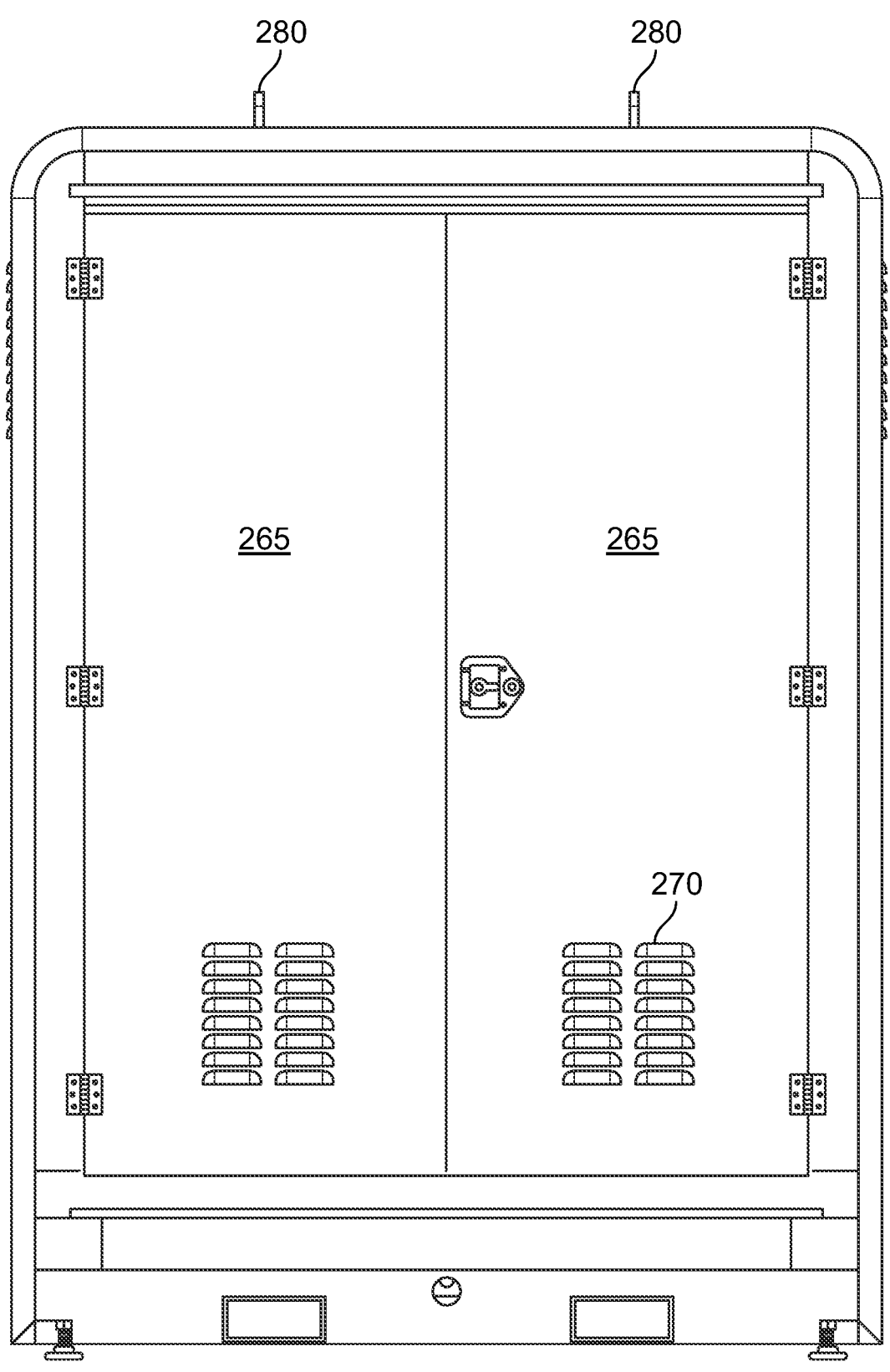

In a simple embodiment, the base of the structural component is physically connected to (or of a single piece with) an upright frame (e.g. aluminum or steel tubes) 150. In certain embodiments, the frame and base are fastened together (e.g. using bolted flanges), while in other embodiments, the frame and base together are a single steel unit. The frame may be smaller than the outer dimensions of the screen component in certain embodiments, in order to keep it hidden. It may be seen from the back (as shown in FIG. 2B and FIG. 4) or it may be covered by a cladding (as shown in FIG. 5B) or even a second video screen (not shown). Back-to-back video screens may be provided (i.e. as a sandwich) which are mounted to a single frame or two parallel frames, which may be connected to a common base component.

Figure 3:
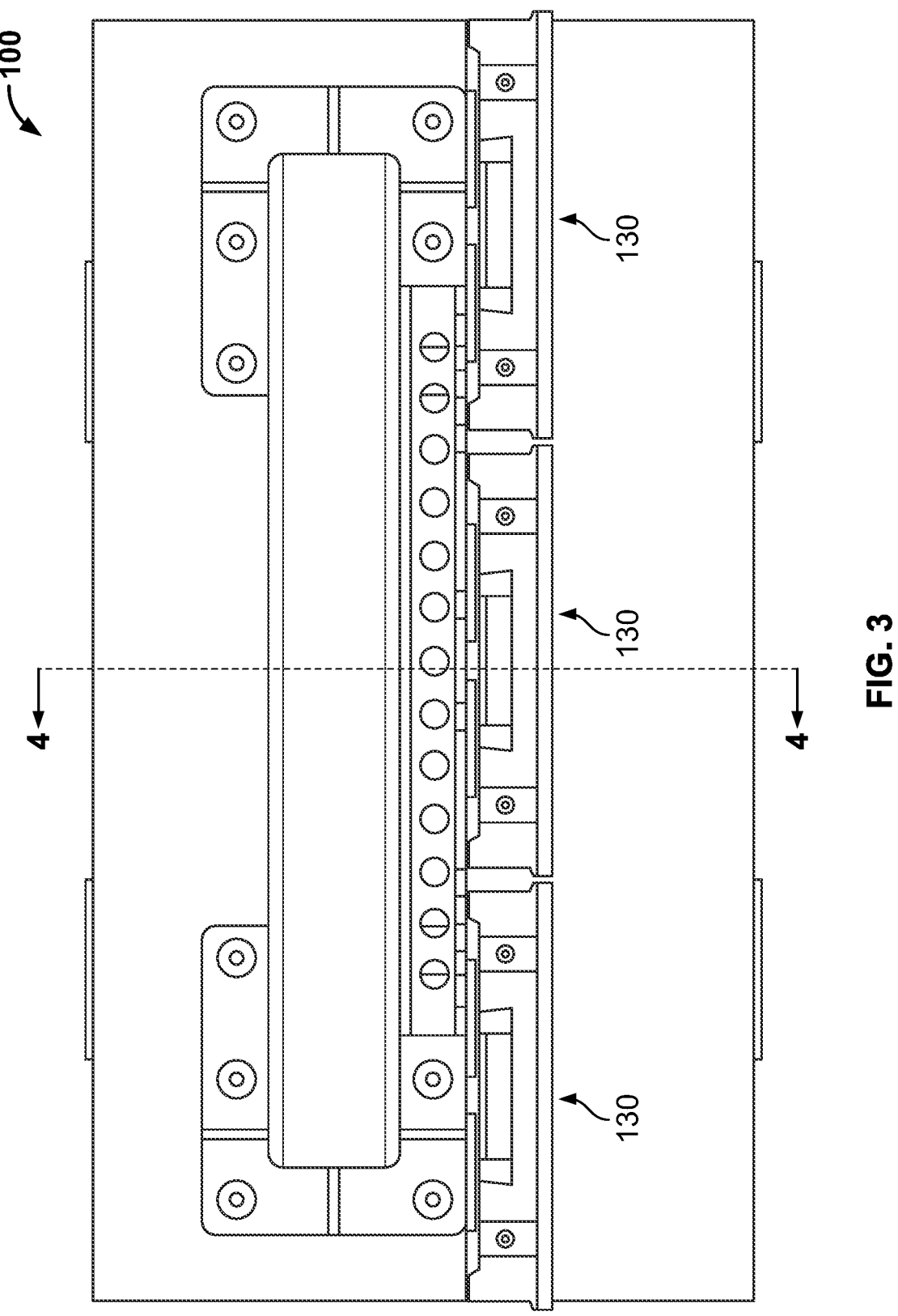
FIG. 3 is a top view of the system.

A top view of the system is shown in FIG. 3. In this view the molding of the individual screen tiles can be clearly seen, as well as their close spacing to each other in the array.

FIGS. 1-4B (and 6A-C) show a simplified (uncladded) version of the system 100. An alternative embodiment 200 is shown in FIGS. 5A-5B, which includes a weatherproof enclosure (cladding) 260. This cladding is (preferably) a fabricated steel or aluminum shell which may surround all or part of the screen component 210 with its screen tile modules 230 and/or base 220. The cladding 260 protects the unit from rain, cold, etc., and gives a more finished appearance. In one embodiment, the cladding may have doors 265 like a cabinet (see FIG. 5B) allowing access to interior controls, optional on-board power supply and other components. The cladding may have vents 270 as shown. In one embodiment, the unit (with cladding) also includes hooks on the top for optional deployment using hooks 280 from a crane. The cladding may be assembled on the unit prior to site installation, or it may be added at site. The cladding may also be part of the overall structure. As with the first (simpler) embodiment, forklift tubes 240 (or recesses) may be provided in the base portion 220.

The base portion 220 shown in FIGS. 5A-5B is a more minimalist base portion, which may be chamfered for lower profile (and also to prevent attendees from sitting on the base or leaving objects or garbage behind on the base).

Figure 7:
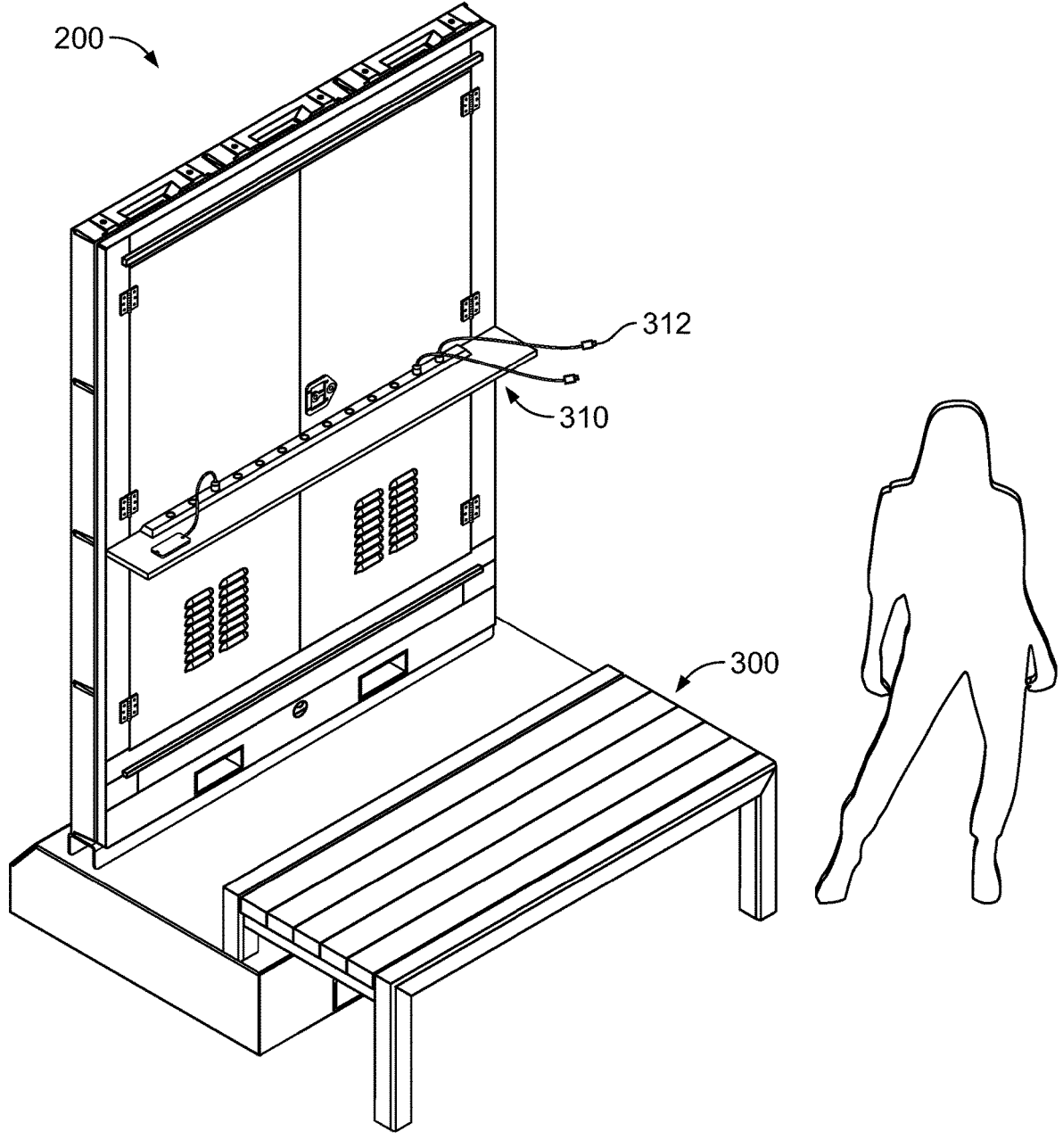
FIG. 7 is a back view with optional bench and charging station.

Various add-ons to the system are also possible. As illustrated in FIG. 7, the system 200 may also include connected furniture components (such as bench 300) and conveniences such as device charging stations 310 with charging connections 312 wired into the system's power. These add-ons may be preinstalled (or integral) and moved with the unit, or may be added at site.

Figure 6A:
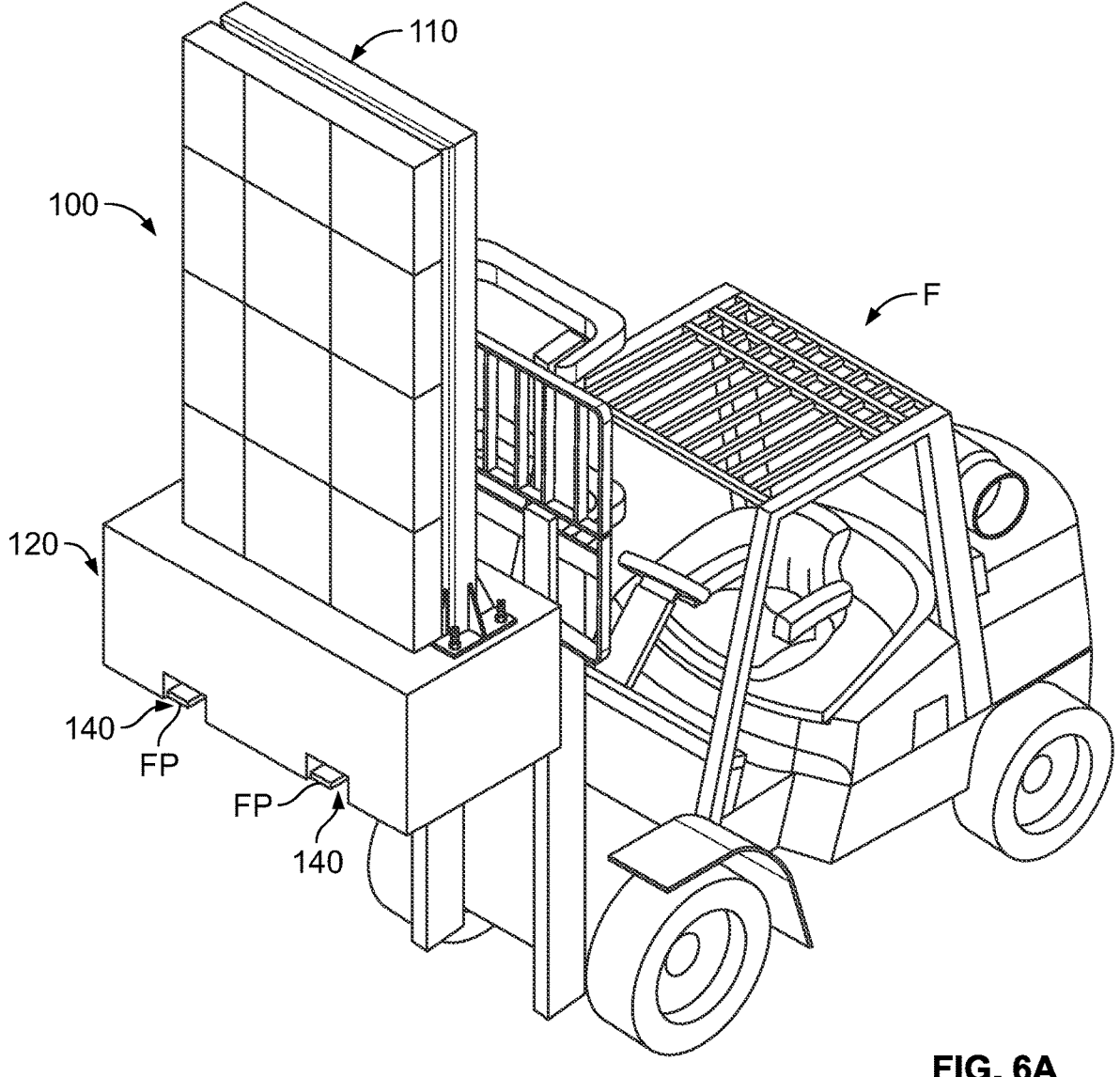
FIGS. 6A-C are installation views showing (A) forklifted view (raised); (B) placement on site (lowered); (C) connection to power/content.
Figure 6B:
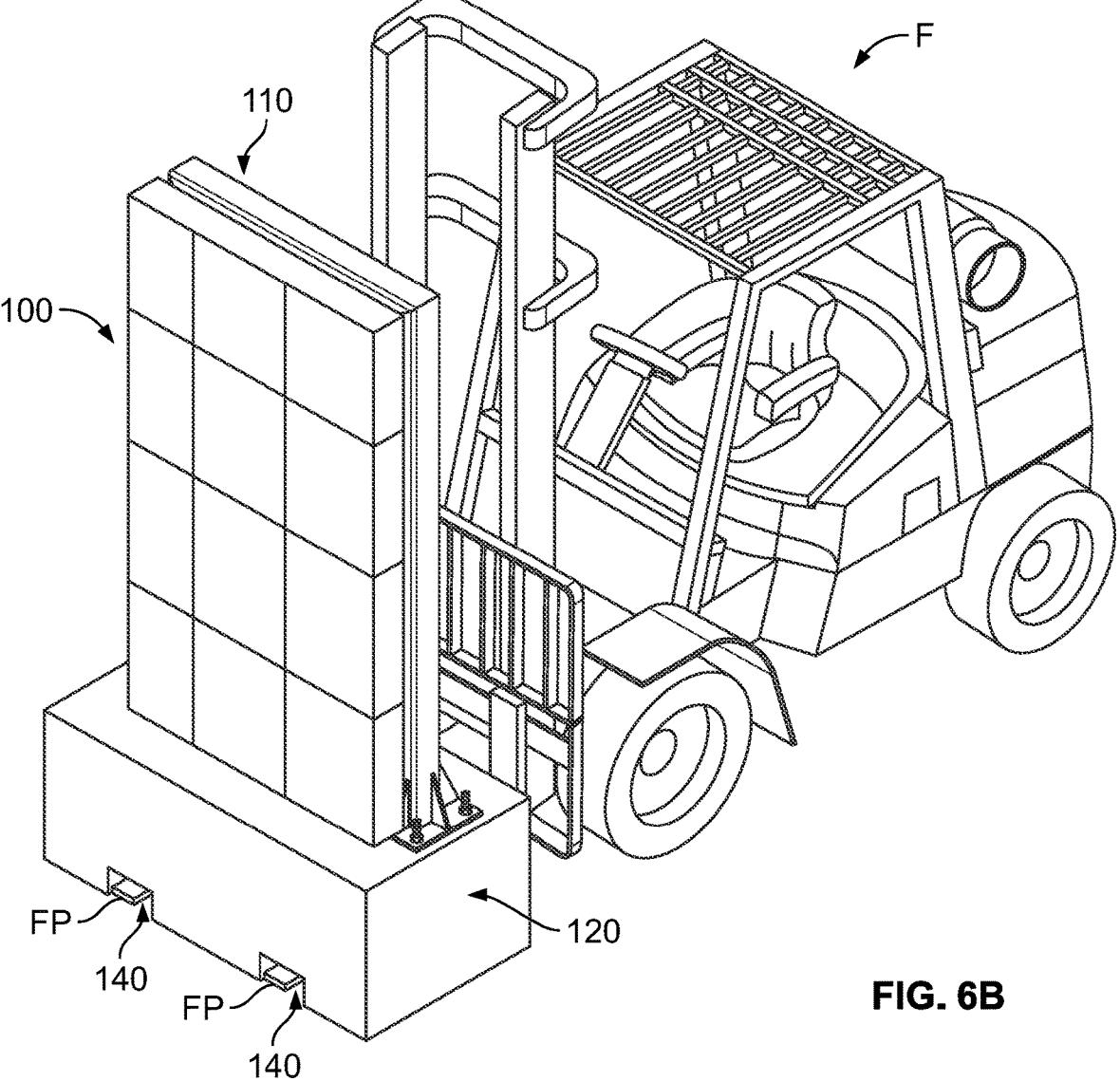

FIGS. 6A and 6B show lifting and placing the system 100 using a standard forklift F. The entire unit can be lifted by inserting forklift prongs FP into tubes 140 on the base portion of the unit, whereupon the unit can be moved into place and deposited. Although a relatively level surface is preferred, no advance preparation is necessary for the popup video display system. In particular, the unit 100 is fully free-standing as its weighted base portion 120 provides sufficient ballast and stability does not need ground-anchoring or bolting into a prepared plinth or substrate of any kind, or placement on a prepared foundation. For this reason, the system is also suitable for areas with minimal ground preparation (e.g. unpaved and field areas, such as in many typical fairgrounds). Forklift deposit (and removal) need not require paved road access.

In other embodiments, the structural component may include hooks or ears (e.g. on the frame/mounting portion, see e.g., 280) that are engageable by a crane. These may be used (instead of, or in conjunction, with forklift) to drop in a popup video display system from any type of well-known small crane, jib or jack.

Figure 6C:
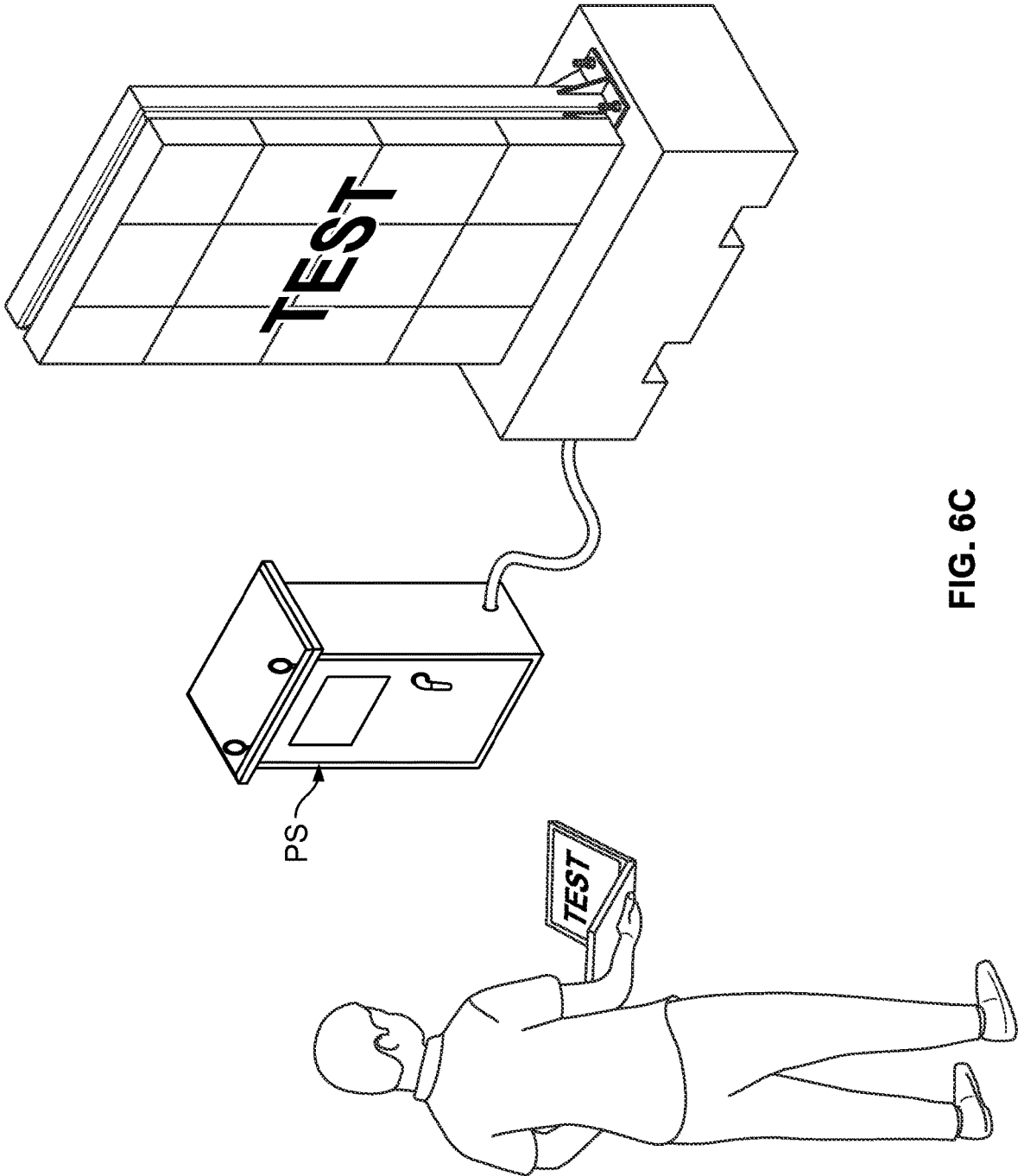

As shown in FIG. 6C, minimal on-site setup/bootup time is required. The plug-and-play unit is simply connected with a power supply PS and connected to a wired or wireless content feeding system. Content feed can be by wireless or wired connection from a content serving engine (which may be remote). In simpler embodiments, the system may be used like a digital billboard with a simple static message or graphic. In more complex embodiments, the content is varied or cycled with animated segments or videos, for example. In still more complex embodiments, the content is keyed to sensors 197 or cameras 195 mounted on the unit or nearby (visibly or hidden) so that the display responds interactively to persons or activities occurring in its vicinity.

Sensors 197 or cameras 195 may be provided in or on the unit so that the content being displayed is triggered by some aspect of the activity in or around the unit and users/visitors may receive personalized or environmentally-aware content based on the sensors or cameras. Data capture from such sensors and cameras can also be used to provide rich data reporting and analytics to sponsors on use and traffic patterns related to the messaging uptake from the unit. For example, a simple deployment may use the screens as maps of the event and location sensors on each unit allow each of the deployed units to know and display their "you are here" location on the map display.

Interactive features can be triggered, for example, by touch screen (TAP TO PLAY, as shown in FIG. 1A), or by QR code snap/scan using a user's device (SNAP THE CODE TO HEAR MORE, as shown in FIG. 1B). Camera 195 may be used for detecting when a person approaches and triggering specific messaging or interactive content on the screen 110 (e.g. photo booth effects), or providing interactive messaging notified directly to user's device (YOU CAN DONATE TO KIDS SPORTS CHARITY! TAP TO SEND $5, as shown in FIG. 1A). Using a companion app, the user's device may also be enabled to inject AR content when pointed at specific regions of the screen.

Power is preferably provided to the systems from a common power source PS (e.g. generator or other on-site AC power). In certain embodiments, small solar panels may be used (mounted above the screens) to generate all or a portion of the power requirements for the screens (not shown).

In order to promote comprehension of the components of the present specification, relative terms such as up, down, upper, lower, left, right, top, bottom, inner, outer, and so forth, have been used (generally for consistency with the orientations of the components as shown in the figures). It will be appreciated that these may, in some cases, be subject to overall orientation of the container and its fittings and are not intended to state absolutes.

The scope of the claims should not be limited by the preferred embodiments set forth in the foregoing disclosure, but should be given the broadest purposive construction consistent with the description as a whole and having regard to equivalents set forth or implied.

What is claimed is:

1. A preassembled popup video display system for plug-and-play deployment, comprising:
   a digital screen component consisting of an LCD panel or a modular array of LED displays configured to form a contiguous tiled display surface;
   a self-supporting structural component including:
      a weighted base portion having at least a pair of tube openings spaced to receive prongs of a forklift; and
      a structural mounting portion to connect the digital screen to the weighted base portion, wherein the mounting portion includes a frame, integral with or connected to the weighted base portion, the frame being smaller than the outer dimensions of the digital screen, and the digital screen being connected onto the frame;
      wherein the weighted base portion provides sufficient ballast and stability that the system can be deployed in a freestanding fashion without physically connecting the base portion to a substrate or ground or floor surface, and the system can be transported by the forklift without disassembly of the system;
   a multimedia content feeding system in communication with the digital screen component configured to transmit and update content via wireless connection, from a local or remote source; and
   a power supply;
   wherein the components of the system are preassembled to permit plug-and-play deployment.

2. The system of claim 1, wherein the mounting portion includes a camera or sensor, in communication with the content feeding system, wherein data from the camera or sensor is used to affect the content displayed on the digital screen component.

3. The system of claim 1, wherein the mounting portion includes a camera or sensor, in communication with the content feeding system, wherein interacting with the camera or sensor affects the content displayed on the digital screen component.

4. The system of claim 1, further comprising a ruggedized cladding structure cloaking in part the digital screen.

5. The system of claim 4, wherein at least a part of the content feeding system is mounted on or contained in the cladding.

6. The system of claim 1, further comprising a user interface, selected from touch screen, scannable QR code or NFC communication, that enables direct user interaction or content customization.

7. A method of deploying a popup video display system, comprising:
   providing a preassembled video display system in a plug-and-play configuration comprising:
      a preassembled digital screen component consisting of an LCD panel or a modular array of LED displays configured to form a continuous tiled display surface;
      a self-supporting structural component having:

a weighted base portion having at least a pair of tube openings spaced to receive prongs of a forklift; and a structural mounting portion to connects the digital screen to the weighted base portion, wherein the mounting portion includes a frame, integral with or connected to the weighted base portion, the frame being smaller than the outer dimensions of the digital screen, and the digital screen being connected onto the frame; and a multimedia content feeding system in communication with the digital screen component configured to transmit and update content via wireless connection, from a local or remote source;

engaging and lifting the preassembled video display system with the forklift through the prongs of the forklift with the tubes at the base of the preassembled video display system;

positioning and depositing the preassembled video display system by forklift on a ground or floor surface of a site in a freestanding fashion without connecting the base portion to a substrate or to the ground or floor surface, and without disassembly of the preassembled video display system;

connecting the video display system to a power supply;

initiating operation of the digital screen unit via the content feeding system using a wireless connection.

8. The method of claim 7, wherein the video display system further comprises a cladding structure cloaking in part the digital screen.

9. The method of claim 7, further comprising cladding the digital screen at least in part with a cladding structure on the site.

10. The method of claim 7, wherein prior to depositing the preassembled video display system by forklift, the method further comprises transporting the preassembled video display system by forklift without disassembly of the preassembled video display system.

11. The method of claim 7, wherein the system further comprises a user interface, selected from touch screen, scannable QR code or NFC communication, and the method further comprises activating interactive features of the preassembled video display system via touch screen or connected user interfaces.

12. The method of claim 7, wherein the system further comprises activating interactive features of the pre-assembled video display system via sensors or cameras.

* * * * *